United States Patent
Wada et al.

(10) Patent No.: US 9,951,192 B2
(45) Date of Patent: Apr. 24, 2018

(54) CELLULOSE NANOFIBERS, METHOD FOR PRODUCING SAME, AQUEOUS DISPERSION USING CELLULOSE NANOFIBERS, AND FIBER-REINFORCED COMPOSITE MATERIAL

(71) Applicant: NITTO BOSEKI CO., LTD., Fukushima-Shi, Fukushima (JP)

(72) Inventors: Masanori Wada, Fukushima (JP); Akira Yoshimura, Fukushima (JP); Yoshihiko Amano, Nagano (JP)

(73) Assignee: Nitto Boseki Co., Ltd., Fukushima (JP)

(*) Notice: Subject to any disclaimer, the term of this patent is extended or adjusted under 35 U.S.C. 154(b) by 141 days.

(21) Appl. No.: 14/911,926

(22) PCT Filed: Sep. 11, 2014

(86) PCT No.: PCT/JP2014/074058
§ 371 (c)(1),
(2) Date: Feb. 12, 2016

(87) PCT Pub. No.: WO2015/037658
PCT Pub. Date: Mar. 19, 2015

(65) Prior Publication Data
US 2016/0194462 A1 Jul. 7, 2016

(30) Foreign Application Priority Data

Sep. 11, 2013 (JP) ................................. 2013-188801

(51) Int. Cl.
| | | |
|---|---|---|
| C08B 15/00 | (2006.01) | |
| C08J 5/04 | (2006.01) | |
| C08J 3/215 | (2006.01) | |
| C08J 5/18 | (2006.01) | |
| D21H 11/18 | (2006.01) | |
| D21H 15/02 | (2006.01) | |

(52) U.S. Cl.
CPC .............. *C08J 5/045* (2013.01); *C08B 15/00* (2013.01); *C08J 3/215* (2013.01); *C08J 5/18* (2013.01); *D21H 11/18* (2013.01); *D21H 15/02* (2013.01); *C08J 2329/04* (2013.01)

(58) Field of Classification Search
CPC ..... C08J 5/045; C08J 3/215; C08J 5/18; C08J 2329/04; C08B 15/00; D21H 11/18; D21H 15/02
USPC ........................................................ 524/35
See application file for complete search history.

(56) References Cited

U.S. PATENT DOCUMENTS

| | | | |
|---|---|---|---|
| 4,374,702 | A | 2/1983 | Turbak et al. |
| 2014/0073722 | A1 | 3/2014 | Shiramizu et al. |
| 2014/0073776 | A1 | 3/2014 | Shiramizu et al. |
| 2015/0079866 | A1 | 3/2015 | Chao et al. |

FOREIGN PATENT DOCUMENTS

| | | |
|---|---|---|
| CN | 101851801 A | 10/2010 |
| CN | 102344685 A | 2/2012 |
| CN | 102493021 A | 6/2012 |
| CN | 103103847 A | 5/2013 |
| EP | 2 824 169 A1 | 1/2015 |
| GB | 2 066 145 A | 7/1981 |
| JP | 2000-017592 A | 1/2000 |
| JP | 2011-184816 A | 9/2011 |
| JP | 2011-208293 A | 10/2011 |
| JP | 2012-046848 A | 3/2012 |
| JP | 2012046848 A * | 3/2012 |
| JP | 2012-180602 A | 9/2012 |
| JP | 2012180602 A * | 9/2012 |
| JP | 2013-163773 A | 8/2013 |
| WO | 2011/059398 A1 | 5/2011 |
| WO | 2013/031391 A1 | 3/2013 |
| WO | 2013/031444 A1 | 3/2013 |
| WO | 2013/176033 A1 | 11/2013 |

OTHER PUBLICATIONS

JP2012-046848A—machine translation.*
JP2012-180602A—machine translation.*
Office Action dated Jan. 25, 2017 to corresponding Chinese Patent Application No. 201480047322.X.
Unknown Author, excerpts from Engineering Science and Technology Chinese Master's Theses Full-text Database.
Office Action dated Mar. 17, 2017 issued in the counterpart European Patent Application No. 14844228.8.
Office Action dated Sep. 30, 2017 issued in corresponding Chinese Patent Application No. 201480047322.X.

* cited by examiner

*Primary Examiner* — Ling Siu Choi
*Assistant Examiner* — Ronald Grinsted
(74) *Attorney, Agent, or Firm* — Carrier Blackman & Associates, P.C.; Joseph P. Carrier; Anne G. Sabourin

(57) ABSTRACT

The present invention relates to cellulose nanofibers that have good dispersibility in water and can be contained in a water-soluble polymer at high concentration, and to a method for obtaining the cellulose nanofibers. The present invention further relates to a fiber reinforced composite material using the cellulose nanofibers. Cellulose nanofibers having an average degree of polymerization of 100 or more and 800 or less and an aspect ratio of 150 or more and 2000 or less are produced by subjecting unmodified cellulose to an enzyme and/or acid treatment, and to a mechanical shearing treatment. The cellulose nanofibers have good dispersibility and can be dispersed in a water-soluble polymer at high concentration, and therefore a fiber reinforced composite material having high strength can be obtained.

5 Claims, 2 Drawing Sheets

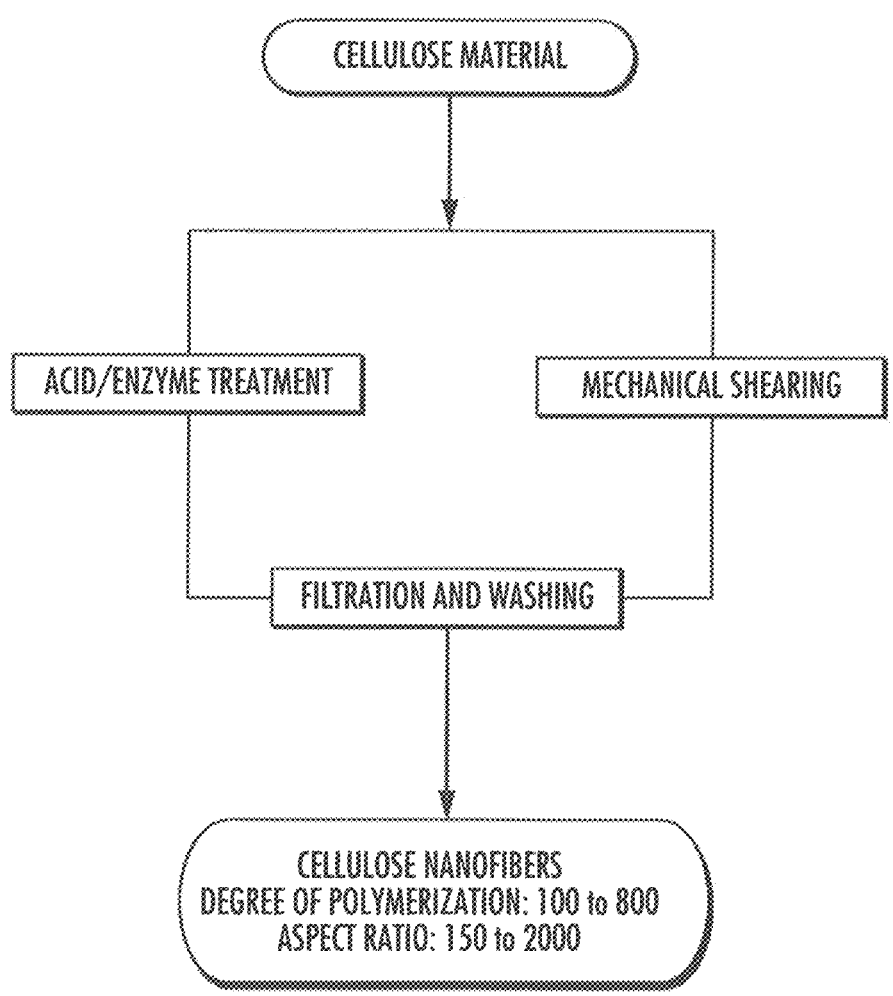

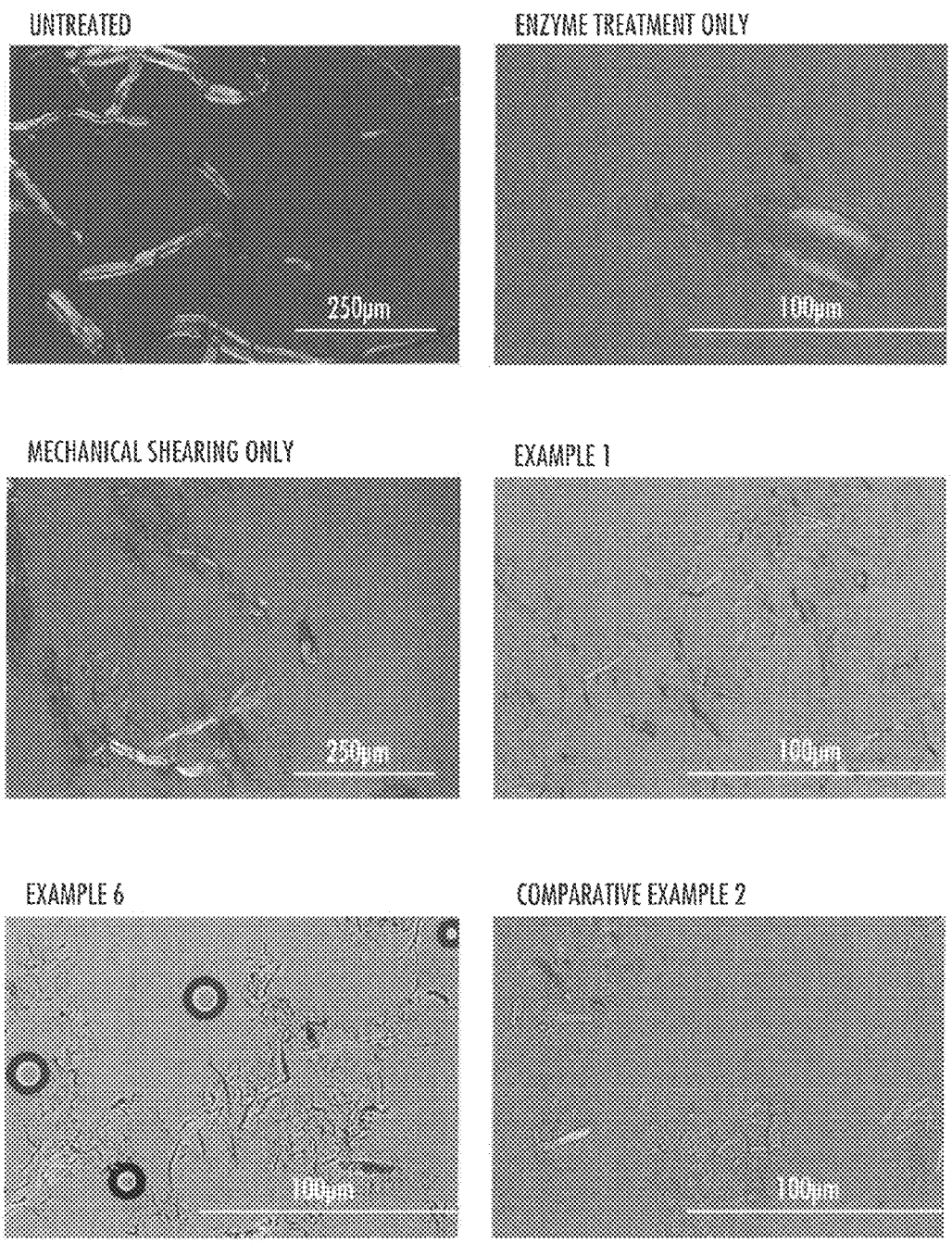

CELLULOSE NANOFIBERS, METHOD FOR PRODUCING SAME, AQUEOUS DISPERSION USING CELLULOSE NANOFIBERS, AND FIBER-REINFORCED COMPOSITE MATERIAL

TECHNICAL FIELD

The present invention relates to cellulose nanofibers having good dispersibility when producing a fiber reinforced composite material by dispersing the cellulose nanofibers in a water-soluble polymer and a method for obtaining the cellulose nanofibers. The present invention further relates to the fiber reinforced composite material using the cellulose nanofibers.

BACKGROUND ART

Since fiber reinforced composite materials have high strength and light weight, they are widely used as structural materials for aircrafts, automobiles, or the like, sporting goods such as golf shafts and tennis rackets, and further molded materials for general industrial applications.

Cellulose nanofibers are conventionally used together with carbon fibers, glass fibers, or the like as reinforcing materials for the fiber reinforced composite materials.

Although carbon fibers or glass fibers have very excellent properties as reinforcing fibers, it is pointed out that they require high energy for production or high environmental load due to difficulty of reuse since they use minerals or fossil fuels as materials.

On the other hand, cellulose nanofibers are advantageous in that, not only they exert excellent reinforcing effects as compared with other reinforcing fibers, but also environmental load during production is low since they are produced from cellulose derived from plants, bacteria, or the like, and further combustion residues do not remain at the time of disposal, unlike glass fibers. Therefore, attention has been given to fiber reinforced composite materials using cellulose nanofibers as reinforcing fibers in recent years.

Cellulose nanofibers can be produced by several methods such as mechanical shearing using a homogenizer or the like (Patent Literature 1) and treating a solution containing an ionic liquid (Patent Literature 2).

An aqueous dispersion obtained by dispersing the cellulose nanofibers produced by the methods described above in water has very high viscosity even at low concentration and has poor dispersibility in a water-soluble polymer. Accordingly, mixing cellulose into a polymer at high concentration, which is so-called high concentration filling, has been not easy. Therefore, a method for improving the dispersibility of cellulose nanofibers in a water-soluble polymer by chemical modification of hydroxyl groups on the surface of the cellulose nanofibers with modifying groups or addition of an additive has been employed (Patent Literature 2).

Further, a method in which desired strength of fiber reinforced composite materials is achieved by mixing a low-concentration dispersion of the cellulose nanofibers with a low-concentration polymer solution and thereafter concentrating the mixture is disclosed (Patent Literature 3).

CITATION LIST

Patent Literature

Patent Literature 1: Japanese Patent Application Laid-Open No. 2000-17592
Patent Literature 2: Japanese Patent Application Laid-Open No. 2011-184816
Patent Literature 3: Japanese Patent Application Laid-Open No. 2011-208293

SUMMARY OF INVENTION

Technical Problem

However, pretreatment steps such as chemical modification of cellulose nanofibers or mixing a low-concentration dispersion of cellulose nanofibers with a polymer solution and thereafter concentrating the mixture to high concentration are complicated, and therefore cellulose nanofibers that do not require such steps have been desired.

Therefore, attempts to improve the dispersibility of cellulose nanofibers have been made by using short cellulose nanofibers having low degree of polymerization, but there is a problem that a composite to be produced cannot have high strength.

In order to solve the above-described problem, it is an object of the present invention to produce cellulose nanofibers that do not require the pretreatment steps such as chemical modification and have good dispersibility in water so as to be contained in a water-soluble polymer at high concentration with good dispersibility, while maintaining the properties of the cellulose nanofibers with excellent reinforcing effects as reinforcing materials.

Solution to Problem

Cellulose nanofibers of the present invention to be used as reinforcing fibers in a fiber reinforced composite material comprise unmodified cellulose, wherein the cellulose nanofibers have an average degree of polymerization of 100 or more and 800 or less and an aspect ratio of 150 or more and 2000 or less.

By producing a fiber reinforced composite material using the cellulose nanofibers having the average degree of polymerization and the aspect ratio of the present invention, even unmodified cellulose nanofibers can be contained in a water-soluble polymer at high concentration with good dispersibility, and therefore a fiber reinforced composite material having high strength can be obtained.

Here, the term, unmodified, means that the hydroxyl groups of the cellulose nanofibers are not chemically modified by an etherifying agent, an esterifying agent, or the like. According to the present invention, cellulose nanofibers that have good dispersibility in water and can be contained in a water-soluble polymer at high concentration with good dispersibility can be obtained without chemical modification. Accordingly, cellulose nanofibers having good dispersibility can be obtained by fewer steps than in conventional techniques. As a result, the production cost can be reduced.

Further, the cellulose nanofibers of the present invention have an average degree of polymerization of 100 or more and 500 or less.

When the average degree of polymerization is in the range of 100 or more and 500 or less, an aqueous dispersion of cellulose nanofibers having better dispersibility can be obtained.

Further, the cellulose nanofibers of the present invention have an aspect ratio of 150 or more and 1000 or less.

When the aspect ratio of the cellulose nanofibers is further in this range, an aqueous dispersion of cellulose nanofibers having better dispersibility with a dispersion degree of 95% or more can be obtained. As a result, with the cellulose nanofibers at high concentration is possible.

Further, the cellulose nanofibers of the present invention have an average fiber diameter of 1 nm or more and 150 nm or less.

When the cellulose nanofibers have an aspect ratio in the above range and further have an average fiber diameter in the range of 1 nm or more and 150 nm or less, uniform dispersibility in a water-soluble polymer can be obtained. As a result, sufficient reinforcing effects on the water-soluble polymer can be obtained, and therefore the properties of a molded product are also improved. Further, since the cellulose nanofibers have uniform dispersibility in the water-soluble polymer, a molded product having high transparency can be produced.

Further, a fiber reinforced composite material is obtained by dispersing the cellulose nanofibers in a water-soluble polymer.

The cellulose nanofibers of the present invention have good dispersibility in water, and can be contained in the water-soluble polymer at high concentration with good dispersibility as described above, and therefore a fiber reinforced composite material having high strength can be obtained.

In an aqueous dispersion of cellulose nanofibers of the present invention to be used as reinforcing fibers in a fiber reinforced composite material, cellulose nanofibers that comprise unmodified cellulose and have an average degree of polymerization of 100 or more and 800 or less and an aspect ratio of 150 or more and 2000 or less are dispersed in water.

The inventors have revealed that even unmodified cellulose nanofibers have very good dispersibility in water when cellulose nanofibers having the average degree of polymerization and the aspect ratio of the present invention are used.

Further, in the aqueous dispersion of cellulose nanofibers of the present invention, the cellulose nanofibers have an average degree of polymerization of 100 or more and 500 or less.

When the cellulose nanofibers have an average degree of polymerization in the above range, an aqueous dispersion of cellulose nanofibers with higher dispersibility can be obtained.

Further, in the aqueous dispersion of cellulose nanofibers of the present invention, the cellulose nanofibers have an aspect ratio of 150 or more and 1000 or less.

When the aspect ratio of the cellulose nanofibers is in the above range, an aqueous dispersion of cellulose nanofibers with higher dispersibility can be obtained.

Further, in the aqueous dispersion of cellulose nanofibers of the present invention, the cellulose nanofibers have an average fiber diameter of 1 nm or more and 150 nm or less.

This is because an aqueous dispersion of cellulose nanofibers with high dispersibility water is obtained by using cellulose nanofibers having an average fiber diameter in the above range, and a fiber reinforced composite material with good mechanical properties such as tensile strength can be obtained by using the aqueous dispersion of cellulose nanofibers.

Further, a fiber reinforced composite material of the present invention is produced using the aqueous dispersion of cellulose nanofibers.

Since the aqueous dispersion of cellulose nanofibers of the present invention allows filling with cellulose nanofibers at high concentration because of its high dispersibility, a fiber reinforced composite material with high strength can be obtained.

Further, in a method for producing cellulose nanofibers of the present invention, a cellulose material is subjected to an enzyme and/or acid treatment at least once, and to a mechanical shearing treatment at least once.

Cellulose nanofibers that can be contained in a water-soluble polymer at high concentration with good dispersibility and have sufficient reinforcing and strengthening effects when used in a fiber reinforced composite material, can be obtained by being subjected to an enzyme and/or acid treatment, and to a mechanical shearing treatment.

BRIEF DESCRIPTION OF DRAWINGS

FIG. 1 is a flowchart illustrating a production process of cellulose nanofibers.

FIG. 2 is optical microscope images of cellulose nanofibers.

DESCRIPTION OF EMBODIMENTS

Hereinafter, the present invention will be described in detail by way of examples. As a cellulose raw material for the cellulose nanofibers of the present invention, any material can be used as long as it contains a large amount of cellulose, such as raw materials derived from plants, e.g., wood, cotton, bamboo, kenaf, jute, abaca, and straws, bacterial cellulose produced by microorganisms, e.g., acetic acid bacteria, cellulose derived from animals, e.g., ascidiacea, cloth, and waste paper.

The plant resources such as wood, cotton, bamboo, kenaf, abaca, and straws and bacterial cellulose produced by microorganisms such as acetic acid bacteria can be preferably used since they are abundantly present as resources.

Further, cellulose nanofibers with good dispersibility in water can be stably produced from dissolving pulp derived from plant resources such as wood, bamboo, and kenaf, and microcrystal cellulose powder, since impurities are removed therefrom to some extent, and cellulose is contained therein at high ratio.

[Method for Producing Cellulose Nanofibers]

As shown in FIG. 1, the cellulose nanofibers of the present invention are produced by subjecting a cellulose raw material to an acid treatment and/or an enzyme treatment, and a mechanical shearing treatment at least once for each, to give cellulose nanofibers having an average degree of polymerization of 100 or more and 800 or less, and an aspect ratio of 150 or more and 2000 or less.

In the case of dissolving pulp, the dissolving pulp is dispersed at a cellulose concentration of 1.0 wt % or more and 2.0 wt % or less, which is subjected to an acid or enzyme treatment in the following treatment conditions.

When performing an acid treatment, the cellulose raw material is treated with hydrochloric acid of 1.0 N or more and 4.0 N or less, or sulfuric acid of 5 vol % or more and 20 vol % or less, by immersion in such an acid at 30° C. or more and 90° C. or less for 5 minutes or more and 120 minutes or less. Meanwhile, when performing an enzyme treatment, the cellulose raw material is treated with an enzyme preparation containing endoglucanase at a concentration of 0.01 g/L or more and 1.0 g/L or less by immersion in the enzyme preparation at 20'C. or more and 40° C. or 1ms for 30 minutes or more and 24 hours or less. Further, the acid treatment can be performed after the enzyme treatment.

In the method for producing cellulose nanofibers of the present invention, the acid treatment and/or enzyme treatment can be performed multiple times, and is preferably performed once or twice. In view of the production cost, it is more preferable that either one of the acid treatment and the enzyme treatment be performed once. In the case of performing either one of the acid treatment and the enzyme treatment, it is preferable to perform the acid treatment. In the case of performing the acid treatment and the enzyme treatment once for each, it is preferable to perform the acid treatment after the enzyme treatment in view of the ease of preparing treatment liquids and workability.

As the raw material, dissolving pulp NSPP or crystalline cellulose powder KC FLOCK, manufactured by Nippon Paper Industries Co., Ltd., Avicel, manufactured by FMC Corporation, or the like, can be preferably used.

As the enzyme, an enzyme containing endoglucanase (EC3.2.1.4) may be used, and crude enzyme solutions such as culture liquids or cell lysates of microbial cells containing the enzyme also can be used, other than purified enzymes or enzyme preparations.

As the enzyme preparations, Acremonium cellulase or Meiseraze, manufactured by Meiji Seiko Pharma Co., Ltd., Cellusoft, Celluclast, or Novozyme476, manufactured by Novozymes A/S, ENZYLON CM, manufactured by RAKUTO KASEI INDUSTRIAL CO., LTD., or the like, can be preferably used.

In any case, the treatment is performed until the average degree of polymerization of cellulose is about 1000 or less at that point, though the treatment time needs to be changed depending on the cellulose raw material to be used. Next, the cellulose raw material is subjected to mechanical shearing, to obtain cellulose nanofibers.

For the mechanical shearing, devices commonly used for a shearing treatment such as a homomixer, an ultrasonic homogenizer, a nanogenizer, a high-pressure homogenizer, an ultra-high-pressure homogenizer, a hammer mill, an aqueous counter collision disperser, a millstone grinder, a freeze grinder, a ball mill, a roller mill, a cutter mill, a planetary mill, a jet mill, a bead mill, an attritor, and a grinder can be used.

The mechanical shearing is performed herein using a millstone grinder (Masscolloider MKCA6-2, manufactured by MASUKO SANGYO CO., LTD.), but any device described above may be used.

In the method for producing cellulose nanofibers of the present invention, the mechanical shearing can be performed multiple times, and is preferably performed once or twice. In view of the production cost, it is preferably performed once.

After the mechanical shearing treatment, the acid or enzyme is reamed from the obtained cellulose fibers by suction filtration, and the cellulose fibers are cleaned further by washing with distilled water several times. It should be noted that, although the filtration and washing are performed after the mechanical shearing treatment, they may be performed after the acid or enzyme treatment.

After capturing at least 5 images of non-overlapping regions by using a scanning electron microscope (S-3400N, manufactured by Hitachi, Ltd.), the fiber diameter and the fiber length of the at least 10 cellulose nanofibers per image were measured. From the data of the fiber diameter and the fiber length obtained above, the average fiber diameter and the average fiber length can be calculated, and the aspect ratio (average fiber length/average fiber diameter) was calculated from these values. It should be noted that, in the present invention, the average fiber length, the average fiber diameter, and the aspect ratio are defined as values calculated by this method.

Further, the average degree of polymerization was measured by the TAPPI T230 standard method (viscosity method). Specifically, the cellulose nanofibers were dissolved in a 0.5 M copper ethylenediamine solution, and the elution time was measured using an Ubbelohde viscometer, to calculate the viscosity-average molecular weight. The viscosity-average molecular weight obtained as above was divided by the molecular weight of glucose that is the constituent unit of cellulose, to calculate the average degree of polymerization. It should be noted that, in the present invention, the average degree of polymerization is defined as a value calculated by this method.

The cellulose nanofibers of Examples 1 to 6 shown below were obtained by adjusting the degrees of the acid or enzyme treatment, and the mechanical shearing in the aforementioned ranges. On the other hand, the cellulose nanofibers of Comparative Examples 1 and 2 were not subjected to the acid or enzyme treatment, and the mechanical shearing in the aforementioned ranges, so that cellulose nanofibers having a high average degree of polymerization (Comparative Example 1) and cellulose nanofibers having a low average degree of polymerization (Comparative Example 2) were obtained. Further, as Comparative Example 4, cellulose nanofibers having a large fiber diameter were obtained by being subjected only to the mechanical shearing.

The optical microscope images of the cellulose nanofibers produced are shown in FIG. 2. Fibers in which both the fiber diameter and the fiber length were large were obtained by performing only the enzyme treatment, or only the mechanical shearing, whereas uniform fibers were obtained in the cellulose nanofibers of the present invention that were obtained by undergoing both of the steps (Example 1and Example 6).

Further, since the cellulose nanofibers having low average degree of polymerization and low aspect ratio (Comparative Example 2) underwent the steps of the enzyme treatment and the mechanical shearing, the obtained fibers were uniform, where however the fiber length or the like was different from the preferable range of the present invention.

[Evaluation of Fiber Reinforced Composite Material]

A film was produced, using nanofibers satisfying the average degree of polymerization, the aspect ratio, and the average fiber diameter of the present invention (Examples 1 to 6), using nanofibers not satisfying these conditions (Comparative Examples 1 and 2), without containing cellulose nanofibers (Comparative Example 3 by performing only the mechanical shearing treatment (Comparative Example 4), to evaluate the light transmittance and the tensile strength.

For producing the film, the cellulose nanofibers of Examples 1 to 6 and Comparative Examples 1, 2, and 4 were added to a polyvinyl alcohol aqueous solution at 5 wt % with respect to resin, and the mixture was stirred with a stirrer for 30 minutes or more. The cellulose nanofiber-containing polyvinyl alcohol solution obtained above was formed into a film, followed by drying, to obtain a 20-μm thick polyvinyl alcohol film containing the cellulose nanofibers.

The dispersion viscosity was obtained by measuring a 1 wt % aqueous dispersion of the cellulose nanofibers using a B-type viscometer (B-type viscometer TV-10, manufactured by TOKI SANGYO CO., LTD., with a viscometer probe No.2) at a rotational speed of 50 rpm and a measurement temperature of 20° C. It should be noted that, in the present invention, the dispersion viscosity is defined as a value measured by this method.

The light transmittance and the tensile strength of the polyvinyl alcohol film obtained above were measured by the following methods, to evaluate the fiber reinforced composite material.

The light transmittance was obtained by measuring the transmittance at 600 nm of the cellulose nanofiber-containing polyvinyl alcohol film using a spectrophotometer (U3900, manufactured by Hitachi., Ltd.).

The tensile strength was obtained by measuring the strength of a 30-mm test piece using a tensile tester (STRO-GRAPH VE20D, manufactured by Toyo Seiki Seisaku-sho, Ltd.) at a tensile test speed of 1 mm/min.

The dispersion degree was calculated using the following formula by measuring sedimentation volume when 100 ml of a 0.1 wt % aqueous dispersion of the cellulose nanofibers was put into a graduated cylinder, and then was allowed to stand still for 24 hours.

Dispersion Degree (%)=Sedimentation Volume (ml)/Dispersion Volume (ml)

A higher dispersion degree indicates a better dispersibility. It should be noted that, in the present invention, the dispersion degree is defined as a value calculated by this method. Table 1 shows the results.

ization as low as an average degree of polymerization of less than 100 and a very low aspect ratio, though the dispersibility is good, a film produced using the cellulose nanofibers cannot have a sufficient tensile strength with the tensile strength not reaching 50 MPa.

Further, when the average degree of polymerization exceeds 800, the dispersion viscosity is high, and therefore a film having a tensile strength reaching 50 MPa cannot be produced. When the aspect ratio of the fibers is 150 or more, sufficient reinforcing effects as reinforcing fibers are expressed, and a tensile strength exceeding 50 MPa can be obtained when a film is produced; however, when the aspect ratio exceeds 2000, the dispersion viscosity is extremely high, and therefore a film with a tensile strength reaching 50 MPa cannot be produced.

Further, the cellulose nanofibers of the present invention preferably have an average degree of polymerization of 100

|  | Average degree of polymerization | Fiber diameter (nm) | Aspect ratio | Dispersion viscosity (mPa · s) | Degree of dispersion (%) | Light transmittance (%) | Tensile strength (MPa) |
|---|---|---|---|---|---|---|---|
| Example 1 | 120 | 40 | 180 | 125 | 97.2 | 75.1 | 59.8 |
| Example 2 | 160 | 50 | 200 | 130 | 97.6 | 74.8 | 60.8 |
| Example 3 | 300 | 35 | 550 | 150 | 95.2 | 69.7 | 54.8 |
| Example 4 | 400 | 45 | 750 | 160 | 95.4 | 68.3 | 51.9 |
| Example 5 | 470 | 40 | 800 | 165 | 95.5 | 66.9 | 51.0 |
| Example 6 | 800 | 150 | 2000 | 420 | 85.3 | 58.0 | 50.2 |
| Comparative Example 1 | 1300 | 100 | 10000 | >600 | 90.4 | 55.1 | 34.5 |
| Comparative Example 2 | 90 | 50 | 20 | 100 | 98.2 | 62.1 | 33.2 |
| Comparative Example 3 | — | — | — | — | — | 77.7 | 47.6 |
| Comparative Example 4 | 1600 | 30000 | 100 | 220 | 19.4 | 57.6 | 42.6 |

All the cellulose nanofibers of the present invention have very good dispersibility, in which the dispersion degree of the aqueous dispersion is 85% or more, and the viscosity of the aqueous dispersion is 420 mPa·s or less. Therefore, the film fraying high transparency with a light transmittance of 58.0% or more and also having an excellent mechanical property with a tensile strength of 50 MPa or more can be produced.

In particular, as shown in Examples 1 to 5, by using cellulose nanofibers having an average degree of polymerization of 500 or less and an aspect ratio of 1000 or less, cellulose nanofibers whose aqueous dispersion has viscosity of 165 mPa·s or less and dispersion degree of 95% or more, and which yield the film having high transparency with a light transmittance of 65.0% or more and are easy to handle, can be obtained. It should be noted that, the lower the dispersion viscosity, the better the dispersibility; therefore the lower limit desirably approximates 1.5 mPa·s that is the dispersion viscosity of water.

On the other hand, as shown in Comparative Example 1, in the case of using cellulose nanofibers having a high average degree of polymerization and a high aspect ratio, the aqueous dispersion of the cellulose nanofibers whose viscosity is very high, and whose dispersion degree is low can only be obtained, resulting in that the film produced with the aqueous dispersion has low light transmittance and low tensile strength. This is probably because the cellulose nanofibers cannot be uniformly dispersed in the water-soluble polymer due to their low dispersibility.

Further, as shown in Comparative Example 2, in the case of using cellulose nanofibers having a degree of polymeror more and 500 or less and an aspect ratio of 150 or more and 1000 or less. The cellulose nanofibers in these ranges allow cellulose nanofibers, having very good dispersibility in which the dispersion viscosity is 165 mPa·s or less and the dispersion degree is 95% or more, to be produced.

Further, the cellulose nanofibers more preferably have an average degree of polymerization of 120 or more and 300 or less and an aspect ratio of 150 or more and 600 or less. Use of the cellulose nanofibers in these ranges allow the film having very high strength in which the tensile strength exceeds almost 55 MPa to be produced.

Further, the cellulose nanofibers preferably have an average degree of polymerization of 120 or more and 180 or less and an aspect ratio of 150 or more and 250 or less. The cellulose nanofibers of the present invention have a very high dispersion degree of about 97% in a solvent by having an average degree of polymerization and an aspect ratio in these ranges. Further, a fiber reinforced composite material using the cellulose nanofibers in these ranges has tensile strength and optical transparency that are particularly excellent.

Further the cellulose nanofibers of the present invention have an average fiber diameter of 1 nm or more and 150 nm or less, and the average fiber diameter is preferably 10 nm or more and 50 nm or less, more preferably 30 nm or more and 50 nm or less. While the average fiber diameter is closely associated also with the aspect ratio, composite materials with high tensile strength can be obtained, because the cellulose nanofibers, with the average fiber diameter falling within such ranges and the above-described aspect ratio, have good dispersibility.

Next, a film was produced while varying the amount of the cellulose nanofibers to be added to the water-soluble polymer, and the light transmittance and the tensile strength of the film were measured.

The cellulose nanofibers used in Example 3 were added to a polyvinyl alcohol aqueous solution at 5 wt % or more and 25 wt % or less with respect to polyvinyl alcohol, which was stirred with a stirrer for 30 minutes or more. The thus obtained cellulose nanofiber-containing polyvinyl alcohol solution was molded into a film, followed by drying, to obtain a 20-μm thick polyvinyl alcohol film containing cellulose nanofibers. The results are shown in Table 2.

TABLE 2

| Concentration (wt %) | Light transmittance (%) | Tensile strength (MPa) |
|---|---|---|
| 0 | 77.7 | 47.6 |
| 5 | 68.3 | 51.9 |
| 10 | 65.0 | 62.4 |
| 15 | 59.3 | 56.1 |
| 20 | 52.7 | 50.1 |
| 25 | 48.2 | 49.4 |

As shown in Table 2, a very strong film with a tensile strength of 62.4 MPa can be obtained when the amount of the cellulose nanofibers to be added to the water-soluble polymer are increased up to 10 wt %. When the cellulose nanofibers are further added, the tensile strength decreases. This is probably because, as the amount of cellulose nanofibers to be added is increased, the cellulose nanofibers are not uniformly dispersed in the water-soluble polymer, resulting in the decreases of strength.

The amount in which the maximum tensile strength is imparted to the film to be produced varies depending on the average degree of polymerization and the aspect ratio of the cellulose nanofibers to be added, but in the case of using cellulose nanofibers having an average degree of polymerization of 300 and an aspect ratio of about 550, a film in which both the light transmittance and the tensile strength are high can be produced by adding an amount of about 5 wt % or more and 20 wt % or less with respect to the water-soluble polymer.

The fiber reinforced composite material of the present invention is preferably obtained by dispersing the cellulose nanofibers of the present invention at 2 wt % or more and 20 wt % or less with respect to the fiber reinforced composite material, and is preferably obtained by dispersing the cellulose nanofibers of the present invention at 8 wt % or more and 16 wt % or less with respect to the fiber reinforced composite material. When the cellulose nanofibers of the present invention are dispersed in the fiber reinforced composite material in such a range, the fiber reinforced composite material has particularly excellent tensile strength.

The invention claimed is:

1. Cellulose nanofibers to be used as reinforcing fibers in a fiber reinforced composite material, the cellulose nanofibers comprising:
    unmodified cellulose, wherein
        the cellulose nanofibers have an average fiber diameter of 1nm or more and 50 nm or less, an average degree of polymerization of 120 or more and 300 or less and an aspect ratio of 150 or more and 600 or less.

2. A fiber reinforced composite material obtained by dispersing the cellulose nanofibers according to claim 1.

3. An aqueous dispersion of cellulose nanofibers to be used as reinforcing fibers in a fiber reinforced composite material, wherein
    the cellulose nanofibers that comprise unmodified cellulose and have an average fiber diameter of 1nm or more and 50 nm or less, an average degree of polymerization of 120 or more and 300 or less and an aspect ratio of 150 or more and 600 or less are dispersed in water.

4. A fiber reinforced composite material produced using the aqueous dispersion of cellulose nanofibers according to claim 3.

5. A method for producing cellulose nanofibers according to claim 1, comprising:
    subjecting a cellulose material to an enzyme and/or acid treatment at least once, and to a mechanical shearing treatment at least once.

* * * * *